United States Patent [19]
Weber

[11] 3,940,754
[45] Feb. 24, 1976

[54] FLUID DETECTOR DEVICE IN A DRIVE MOTOR FOR AN UNDERGROUND MINING MACHINE

[75] Inventor: Karl-Heinz Weber, Witten-Heven, Germany

[73] Assignee: Gebr. Eickhoff, Maschinenfabrik und Eisengiesserei m.b.H., Bochum, Germany

[22] Filed: Aug. 2, 1974

[21] Appl. No.: 494,060

[30] Foreign Application Priority Data
Aug. 30, 1973  Germany............................ 2343752

[52] U.S. Cl.................................. 340/242; 340/270
[51] Int. Cl.².......................................... G08B 21/00
[58] Field of Search ........... 340/242, 235, 267, 269, 340/270, 271; 73/46, 47, 49.7; 317/246; 324/61 TI, 61 QS; 318/483; 310/68 R, 68 B, 68 E, 72, 90

[56] References Cited
UNITED STATES PATENTS

| | | |
|---|---|---|
| 3,028,548 | 4/1962 | Breen............................... 324/61 TI |
| 3,046,479 | 7/1962 | Mead et al....................... 324/61 TI |
| 3,103,002 | 9/1963 | Pearson ........................... 317/246 X |
| 3,122,919 | 3/1964 | Kendrick ......................... 317/246 X |
| 3,176,222 | 3/1965 | Atkisson .......................... 317/246 X |
| 3,226,615 | 12/1965 | Nagel................................ 317/246 |
| 3,430,116 | 2/1969 | Johnstone........................ 317/260 X |
| 3,500,366 | 3/1970 | Chesney et al. ................. 317/246 X |
| 3,774,185 | 11/1973 | Parth ................................ 340/236 |

*Primary Examiner*—John W. Caldwell
*Assistant Examiner*—Daniel Myer
*Attorney, Agent, or Firm*—Brown, Murray, Flick & Peckham

[57] ABSTRACT

An electric drive motor for an underground mining machine includes a capacitive-type detector supported within the motor housing for contact by fluid that may penetrate beyond the motor shaft seals and the like. The capacitance of the detector decreases when fluids penetrate the motor shaft seals and electrical circuitry detects such a capacitance change of the detector for indicating the presence of fluids within the motor housing to prevent damage to the motor windings. The disclosure includes several forms and arrangements of the detector for the electric motor.

10 Claims, 7 Drawing Figures

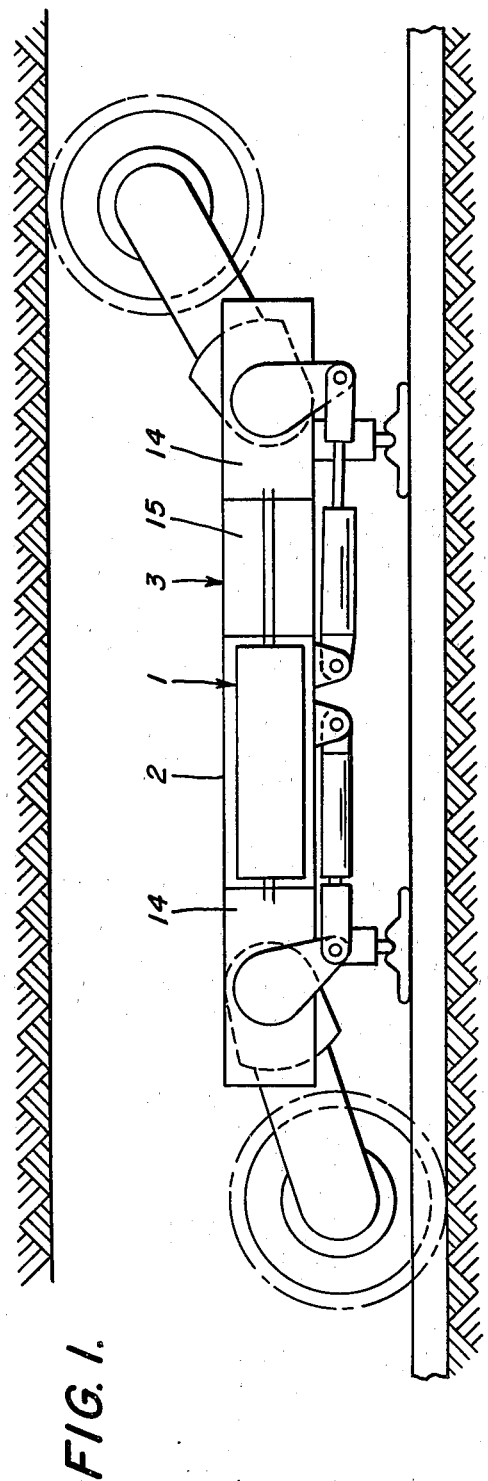
FIG. 1.
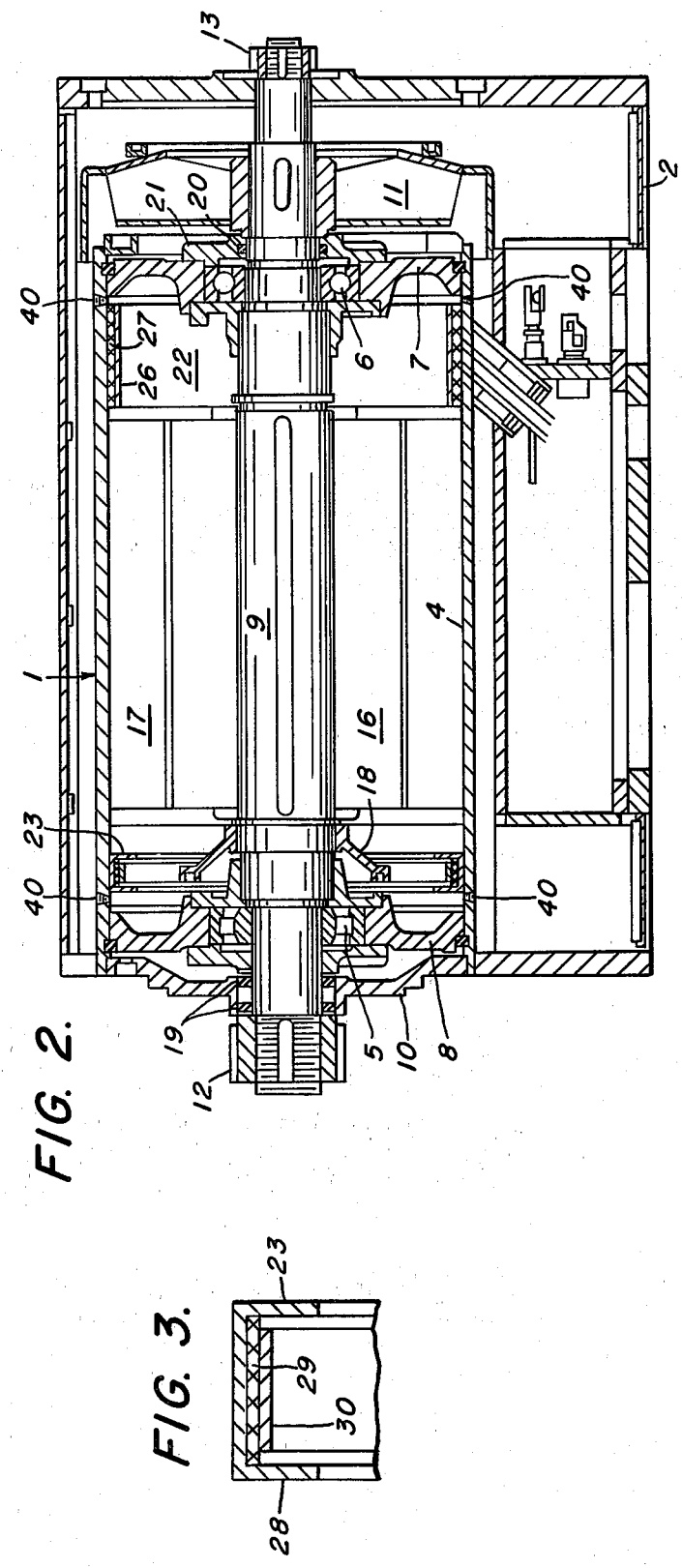
FIG. 2.
FIG. 3.

FLUID DETECTOR DEVICE IN A DRIVE MOTOR FOR AN UNDERGROUND MINING MACHINE

BACKGROUND OF THE INVENTION

This invention relates to a protective device to indicate the possible entry of fluid including liquid substances into the interior of a drive motor for an underground mining machine especially drum-type coal mining machines. Drum or roller-type coal cutting machines consist, in the present state-of-the-art, of a large number of flange connected components. Such underground mining machines are equipped with one or two cutting drums and they include one or sometimes two drive motors, depending upon the desired capacity of the mining machine. A gear head or turret having a drive motor together with cutting drums and worm gears or screw jacks form a single unit which is rigidly attached together to form a compact part of the machine body. The arrangement of parts is such that the ends of the drive shaft project out of the opposite end faces of the drive motor into neighboring gear heads. The drive shaft actually extends into a reducing gear to drive the gear head at one end of the motor and into a worm gear drive at the other end of the motor.

During the extraction operation, the drum cutting machine must travel in a manner so as to follow the direction of a coal seam, for example. As a result, the position of the machine frequently changes from the horizontal and therefore the integrity of the seals must remain effective at those places where the ends of the drive shaft enter into the gear head and the worm gear, respectively. The integrity of these seals is important to the assurance that no lubricating oil from the reduction gearing will penetrate or otherwise find its way into the drive motor causing damage to the motor's winding should the extraction machine be tilted at an angle.

SUMMARY OF THE INVENTION

It is an object of the present invention to provide detector apparatus to indicate the possible entry or penetration of fluid including liquids into the interior of the drive motor and/or the extraction machine therefor.

According to the present invention, there is provided in combination with a drive motor for an extracting machine such as a drum-type coal cutting machine employed for underground mining operations, the drive motor includes windings within a motor housing and having a motor shaft extending through end plates of the motor housing, bearing means supporting the motor shaft for rotation within the housing and annular seal means between the motor shaft and the housing to prevent the passage of fluid into the housing from at least one end thereof, the improvement comprising: capacitive detector means supported within the motor housing for contact by fluid penetrating beyond the seal means and into the motor housing to produce a change to the capacitance of the detector means, and means for producing an electrical signal in response to a change in the capacitance of the detector means.

According to the present invention, there is arranged within the housing of the drive motor, capacitive probes which shield the opposite ends of the motor winding against liquids and which probes are connected to an indicating or switching device. Because the probes which are arranged in such a manner that they always come into contact with liquid which may penetrate into the housing of the motor, the dielectric between the two electrodes constituting the probes is modified by the liquid which penetrates into the housing. As a result, the electrical conductivity of the dielectric increases and the change which this produces in the electrical field between the two electrodes is employed to actuate an indicating or switching device.

In accordance with a further characteristic feature of the invention, the capacitive probes are made in the form of rings which are secured in the hollow of the motor housing or between the motor cover and a bearing plate for the motor shaft, or such rings are located in the area between two spaced-apart seals surrounding the motor shaft within the housing cover. The capacitive probes, located in this way, extend about the entire periphery of the motor housing or about the surface of the cover or, alternatively, they enclose the entire drive shaft and thus the probes always remain accessible for contact with any fluid likely to enter into the housing in an absolute independent manner of the inclination of the mining machine.

Ring-shaped capacitive probes may be supported within the motor housing within the plane of the dynamic balancing ring in which event such probes preferably have a U-shaped cross section which is openly exposed to the balancing ring. Lubricating oil which has penetrated beyond the periphery of the motor shaft, invariably collects on the periphery of the balancing ring which rotates with the motor shaft. As a result of the centrifugal force produced by the rotating balancing ring, the oil is thrown into the open profile of the U-shaped probe where it collects at the lowest point and comes into contact with the dielectric. In order to simplify the mounting and attachment of the ring-shaped probes, it is preferred that the probes are made of material such that they are flexible in the radial direction and that the diameter of the probe is slightly larger than the bore supporting it. In this manner, the probes can be introduced into the hollow bore in the motor housing in a compressed state and then they are allowed to expand and lie in a firmly held position therein.

These features and advantages of the present invention as well as others will be more fully understood when the following description is read in light of the accompanying drawings, in which:

FIG. 1 is an elevational view of an underground mining or extraction machine;

FIG. 2 is a longitudinal section through the drive motor for the mining machine shown in FIG. 1 and illustrating one form of capacitive probes according to the present invention;

FIG. 3 is an enlarged view of the capacitive probe illustrated in FIG. 2;

Figure 4:
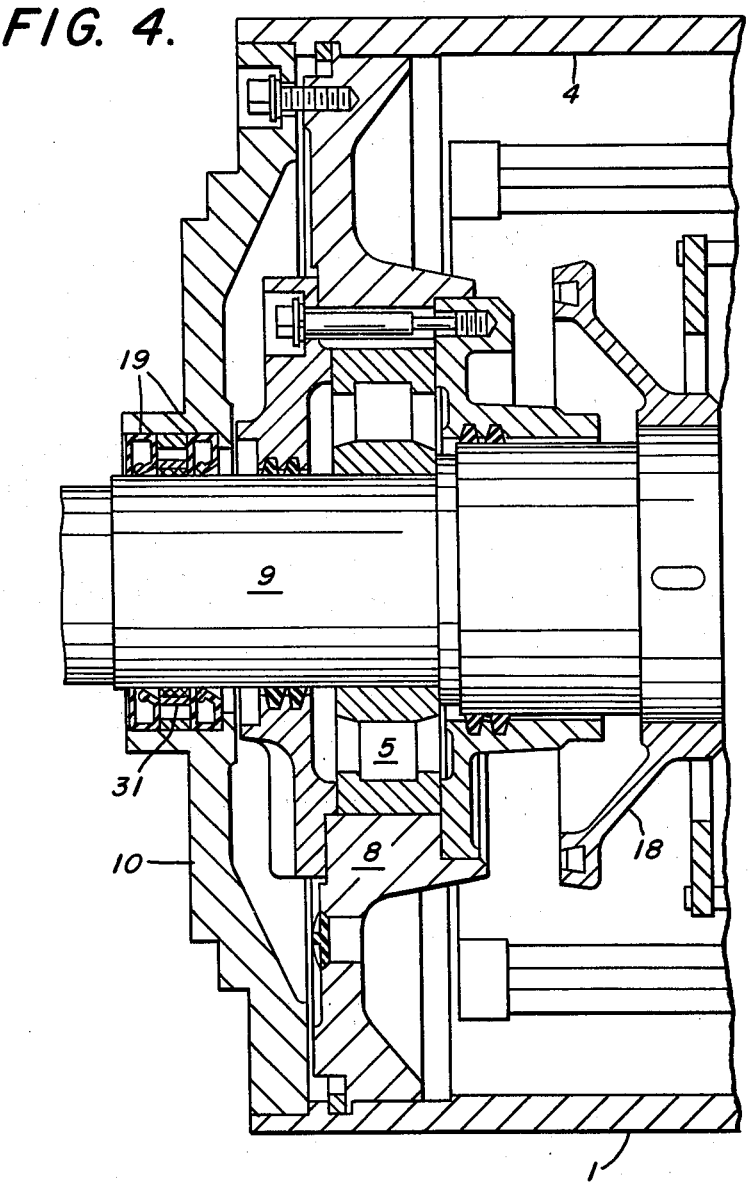
FIG. 4 is a view similar to FIG. 2 but illustrating a second form of capacitive probe according to the present invention.

In FIG. 1, there is illustrated a drive motor 1 located on a housing frame 2 of the body of a drum-type coal cutting machine 3. The drive motor as shown in FIG. 2 consists essentially of a cylindrical motor housing 4 with bearing plates 7 and 8 carrying ball or other type of bearing assemblies 5 and 6 used to rotatably support a motor shaft 9. An end cover plate 10 is provided at one end of the motor housing and a ventilator fan 11 is located at the other end of the housing. Both ends of the drive shaft 9 project outwardly beyond end faceplates of the housing frame 2 where they are provided with a spur gear 12 at one end and a spur gear 13 at the other end. These gears project into the adjacent constructional parts of the mining machine and specifically into gear head or turret 14 and worm gear drive 15 of the drum-type coal cutting machine 3. The ventilator fan 11 is located in front of the bearing plate 7, that is, outwardly of the motor housing, and motor cover 10 closes off the opposite end of the motor housing 4.

On the motor shaft 9 located within the motor housing 4 is an armature winding 16 which is surrounded by a field winding 17. Attached to the motor shaft 9 is a balancing ring 18 which is located between the armature winding 16 and the bearing support plate 8. The area within the motor housing 4 is closed off at both ends by seals 19 and 20 supported by cover 10 and an end cap 21, respectively. The seals are stationary and engage the rotating drive shaft 9. These seals, together with the other seals in adjacent gear head 14 and worm drive 15, are provided to insure that oil does not enter into the motor housing 4 from the gear drive units 14 and 15.

According to the present invention, there is provided, inside the motor housing 4 in front of the end faces of windings 16 and 17, capacitive probes 22 and 23 which actuate an indicating device 24 or a shut-off device 25 should fluid, particularly a liquid, enter into the housing, thereby warning the operator of the drum-type coal cutting machine or, alternatively, shutting down the operation of the machine.

In FIG. 2, the capacitive probe 22 includes a ring 26 having its outer peripheral surface facing toward the housing bore. The ring 26 is provided with ribs of an electrical insulating material 27. The ring 26 and the housing 4 form two electrodes or charge carriers which have different states of electrical charge and separated from each other by an air gap or ribs of insulation 27.

A capacitive probe 23 is located at the other end of the motor windings and includes a U-shaped ring 28 extending about the periphery of the bore in the housing. The ring 28 lies in the same plane as the balancing ring 18 and the open profile provided by the U-shaped configuration faces toward the balancing ring. Insulation 29, consisting of individual and spaced apart ribs, separates the U-shaped ring 28 from a narrower ring 30 lying inside it as best illustrated in FIG. 3. The two rings 28 and 30 have different states of electrical charge.

Figure 5:
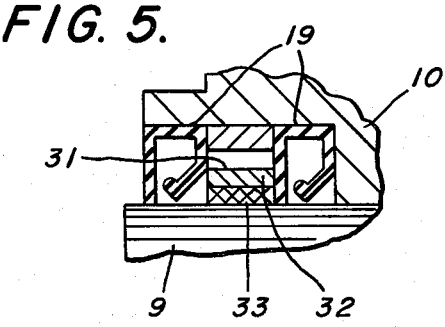
FIG. 5 is an enlarged view of the capacitive probe associated with seals for the motor shaft shown in FIG. 4.

FIGS. 4 and 5 illustrate a further arrangement of parts according to the present invention to form a capacitive probe 31 in the area between two spaced-apart seals 19 which are carried by the motor cover 10. The capacitive probe 31 includes a ring 32 surrounding the motor shaft 9 and insulated therefrom by a dielectric 33. The dielectric consists in the main of an air gap, but may also consist of ribs distributed about the annular bore defined by the ring 32. In this embodiment of the invention, the motor shaft 9 and ring 32 have different states of electrical charge.

Figure 6:
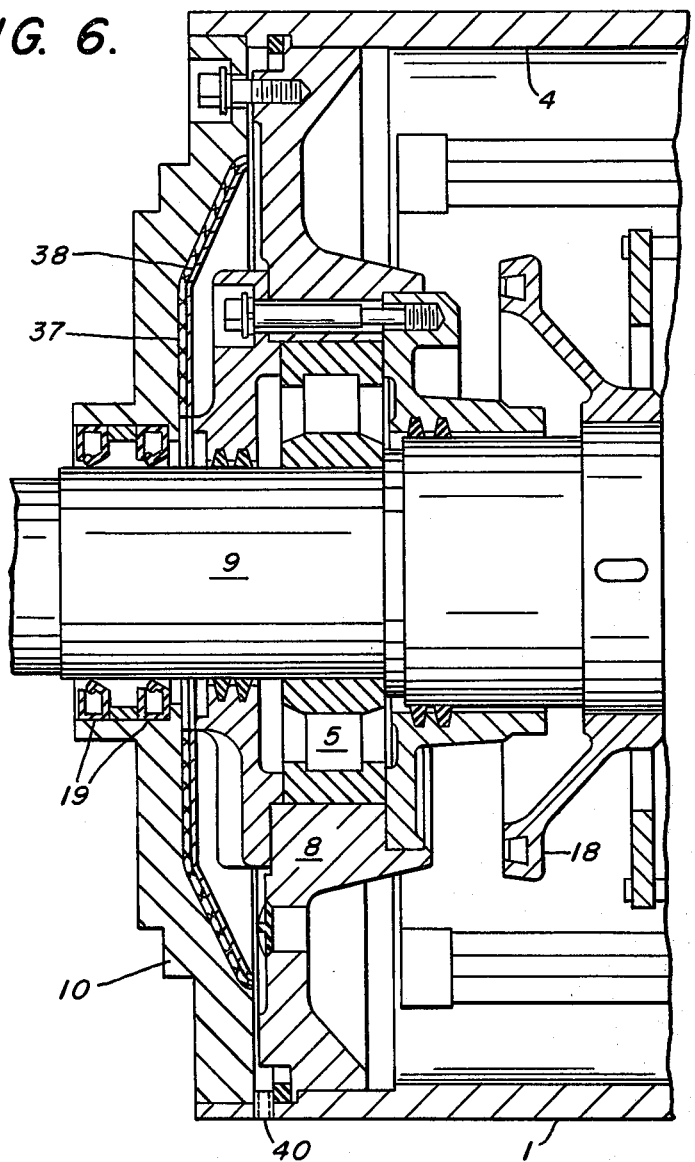
FIG. 6 is a view similar to FIG. 2 and illustrating a further embodiment of the capacitive probe according to the present invention.
Figure 7:
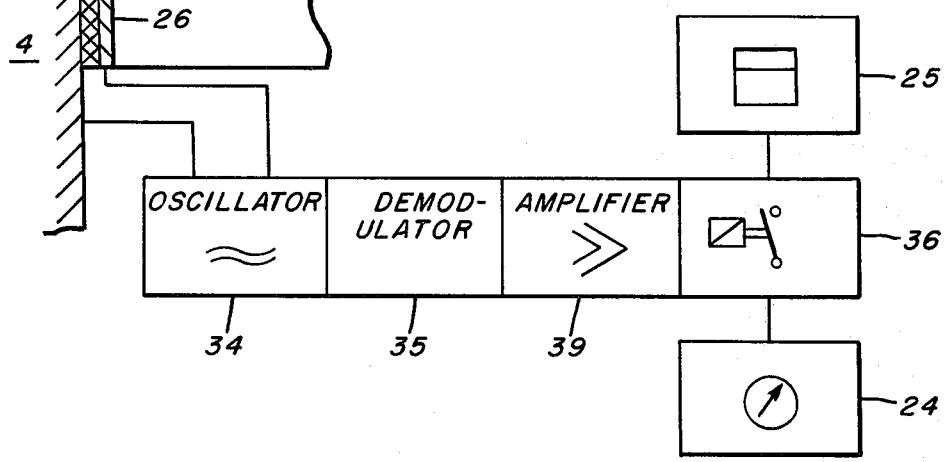
FIG. 7 is a circuit diagram for detecting a capacitance change by a probe according to the present invention.

FIG. 6 illustrates a further embodiment of the present invention wherein the motor cover 10 carries a disc-shaped probe 37 on its inner facing surface. The probe 37 is insulated from the cover by a dielectric 38. In this embodiment, the disc-shaped probe 37 and the motor cover 10 have different states of electrical charge which give rise to indicating or switching pulses when the capacitance of the dielectric changes due to the penetration of moisture beyond the two seals 19 into the motor housing.

The capacitance of each probe 22, 23, 31 and 37 is based on (1) the values of the dielectric constants; (2) the areas of the two electrodes forming the charge carriers; and (3) the distance between the electrodes of the probes. The capacitance is inversely proportional to the separation distance between the electrodes. Moisture reduces the value of the dielectric constant and, hence, the capacitance of the probes 22, 23, 31 and 37. This change in capacitance is superimposed on a series-connected oscillator 34 and forms by way of a demodulator 35 and amplifier 39, an output signal to control the operation of a relay 36. The relay 36 actuates a switching device 25 to turn OFF the current supplied to the drive motor of the mining machine. Alternatively, an output signal from the relay 36 can be employed to energize an indicating device 24, thereby informing the machine operator that fluids which may include a liquid have penetrated into the confines of the motor housing.

FIGS. 2 and 6 illustrate a radial arrangement of bored holes spaced about the periphery of the motor housing. These holes are closed off by plugs 40. By removing the plugs 40, liquid which has penetrated into the motor housing 4 can be drained off so that the drum-type coal cutting machine can remain in operation until appropriate repairs can be accomplished.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for detecting penetration of fluid in combination with a drive motor for an extracting machine such as a drum-type coal cutting machine employed for underground mining operations, said drive motor including windings within a motor housing, a motor shaft extending through end plates at the ends of the motor housing, bearing means supporting the motor shaft for rotation within the housing, and annular seal means between the motor shaft and the housing to normally prevent the passage of fluid into the housing from at least one end thereof, the improvement comprising:

capacitive means including at least one charged carrier probe spaced from said seal means along said motor shaft for ultimate support by the motor housing between the end plates in a manner such that fluid penetrating into the motor housing beyond said seal means contacts and reduces the capacitive charge of said capacitive means, detecting means coupled in an electric circuit which includes said capacitive means for producing an electrical signal corresponding to a decrease capacitance of said capacitive means to thereby indicate penetration of fluid into the motor housing, and means energized in response to said electrical signal.

2. The combination according to claim 1 wherein said means energized in response to said electrical signal includes an indicating device for indicating the change in the capacitance of the detector means.

3. The combination according to claim 1 wherein said means energized in response to said electrical signal includes control means for rendering said drive motor inoperative.

4. The combination according to claim 1 wherein said capacitive means includes an annular member arranged within the motor housing between an end plate therefor and a support plate carrying a bearing means for said motor shaft.

5. The combination according to claim 1 wherein said capacitive means includes a generally disc-shaped plate supported in a closely-shaped relation by a dielectric from the inside surface of an end plate for the motor housing.

6. The combination according to claim 1 wherein said annular seal means includes two annular seal elements carried by an end plate of the motor housing in a spaced-apart relation along said motor shaft, and wherein said capacitive means includes an annular ring between said seal elements.

7. The combination according to claim 1 wherein said capacitive means includes an annular ring carried by an internal face surface of said motor housing.

8. The combination according to claim 1 further comprising a balancing ring carried by said motor shaft, and said capacitive means includes an annular ring having a U-shaped cross section facing in an outwardly-spaced relation from said ring, said annular ring being supported within said motor housing so as to lie within the radial plane containing said balancing ring.

9. The combination according to claim 1 wherein said capacitive means includes a radially flexible annular ring having an outer diameter thereof exceeding the diameter of the internal support surface thereof in the motor housing.

10. The combination according to claim 7 wherein said capacitive means further includes insulating ribs carried in a spaced-apart relation along the face surface of said annular ring.

* * * * *